US012377528B2

(12) United States Patent
Nakajima et al.

(10) Patent No.: US 12,377,528 B2
(45) Date of Patent: Aug. 5, 2025

(54) DRIVING DEVICE

(71) Applicant: Koki Holdings Co., Ltd., Tokyo (JP)

(72) Inventors: Tomoya Nakajima, Ibaraki (JP); Jun Enta, Ibaraki (JP); Takeshi Saitou, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 428 days.

(21) Appl. No.: 17/631,192

(22) PCT Filed: Jul. 28, 2020

(86) PCT No.: PCT/JP2020/028791

§ 371 (c)(1),
(2) Date: Jan. 28, 2022

(87) PCT Pub. No.: WO2021/020364

PCT Pub. Date: Feb. 4, 2021

(65) Prior Publication Data

US 2022/0176532 A1 Jun. 9, 2022

(30) Foreign Application Priority Data

Jul. 31, 2019 (JP) ................................ 2019-140959

(51) Int. Cl.
*B25C 1/18* (2006.01)
*B25C 7/00* (2006.01)

(52) U.S. Cl.
CPC ................ *B25C 1/188* (2013.01); *B25C 7/00* (2013.01)

(58) Field of Classification Search
CPC .. B25C 1/00; B25C 1/005; B25C 1/04; B25C 1/06; B25C 1/188; B25C 7/00
See application file for complete search history.

(56) References Cited

U.S. PATENT DOCUMENTS 2,761,157 A * 9/1956 Chism ...................... B21G 3/16 470/195
4,049,181 A * 9/1977 Kametaki .............. B25C 1/005 227/113

(Continued)

FOREIGN PATENT DOCUMENTS

JP 4524587 B2 8/2010
JP 4618537 B2 1/2011
JP 2019-098451 A 6/2019

OTHER PUBLICATIONS

International Search Report issued in corresponding International Application No. PCT/JP2020/028791, dated Oct. 27, 2020 w/English Translation.

(Continued)

*Primary Examiner* — Robert F Long
*Assistant Examiner* — Eduardo R Ferrero
(74) *Attorney, Agent, or Firm* — Rimon P.C.

(57) ABSTRACT

A driving device includes: a main body; a striking part movably supported by the main body; a handle protruding from the main body; and a nose part attached to the main body and holding a fastener before being hit by the striking part, the nose part movably accommodating the striking part and having an injection path for guiding the fastener and an injection port connecting with the injection path and firing the fastener, an opening extending from the injection port toward the handle being provided on a handle side of the injection path, and a width of the opening being larger than an outer diameter of a head of the fastener in a plan view perpendicular to a linear moving direction of the striking part.

16 Claims, 14 Drawing Sheets

(56) References Cited

U.S. PATENT DOCUMENTS

| | | | | | |
|---|---|---|---|---|---|
| 4,858,812 | A * | 8/1989 | Fealey | B25C 1/003 227/139 |
| 5,131,579 | A * | 7/1992 | Okushima | B25C 1/008 173/210 |
| 5,231,750 | A * | 8/1993 | Fealey | B25C 1/047 173/127 |
| 5,588,788 | A * | 12/1996 | Dominguez | H02G 3/121 411/923 |
| 6,499,642 | B1 * | 12/2002 | Amada | B25C 1/005 227/119 |
| 7,395,953 | B2 * | 7/2008 | Ishizawa | B25C 1/047 227/120 |
| 8,931,676 | B2 * | 1/2015 | Braddock | B25C 1/005 227/107 |
| 9,573,260 | B2 * | 2/2017 | Walters, Jr. | B25C 5/1658 |
| 9,993,912 | B2 * | 6/2018 | Lee | B25C 5/1617 |
| 10,253,510 | B2 * | 4/2019 | Yang | B25C 3/00 |
| 2002/0017548 | A1 | 2/2002 | Jalbert et al. | |
| 2003/0000990 | A1 * | 1/2003 | White | B25C 5/1627 227/119 |
| 2006/0011692 | A1 | 1/2006 | Ishizawa et al. | |
| 2006/0011694 | A1 | 1/2006 | Ishizawa et al. | |
| 2006/0102683 | A1 * | 5/2006 | Schnell | B25C 1/005 227/119 |
| 2006/0157528 | A1 * | 7/2006 | Osuga | B25C 1/188 227/130 |
| 2007/0164075 | A1 * | 7/2007 | Chen | B25C 5/1668 227/119 |
| 2008/0264997 | A1 | 10/2008 | Shea et al. | |
| 2009/0057366 | A1 | 3/2009 | Braddock | |
| 2012/0187177 | A1 * | 7/2012 | Myburgh | B25C 1/005 227/120 |
| 2013/0320063 | A1 * | 12/2013 | Gregory | B25C 1/001 227/139 |
| 2013/0320067 | A1 * | 12/2013 | Gregory | B25C 1/005 227/139 |
| 2014/0331474 | A1 * | 11/2014 | Walters, Jr. | B25C 1/005 227/127 |
| 2016/0222680 | A1 * | 8/2016 | Yang | E04F 21/22 |
| 2018/0318996 | A1 * | 11/2018 | Bodin | B25C 1/18 |
| 2021/0197352 | A1 * | 7/2021 | Ueda | B25F 5/006 |
| 2022/0134524 | A1 * | 5/2022 | Shioya | B25C 1/047 227/130 |

OTHER PUBLICATIONS

Office Action received in corresponding Taiwanese Patent Application No. 109113620, dated Jun. 24, 2024.

The First Office Action received in corresponding Chinese Patent Application No. 202080054759.1, dated Mar. 28, 2024.

* cited by examiner

DRIVING DEVICE

CROSS REFERENCE TO RELATED APPLICATIONS

This application is the U.S. National Phase under 35 U.S.C. § 371 of International Application No. PCT/JP2020/028791, filed on Jul. 28, 2020, which claims the benefit of Japanese Application No. 2019-140959, filed on Jul. 31, 2019, the entire contents of each are hereby incorporated by reference.

TECHNICAL FIELD

The present invention relates to a driving device having a nose part to which fasteners are supplied and a striking part capable of striking the fastener.

BACKGROUND ART

Patent Document 1 discloses an example of a fastener driving device, the fastener driving device including: a nose part to which fasteners are supplied; and a driver blade capable of striking the fastener. The fastener driving device disclosed in Patent Document 1 has a main body, an accumulator chamber, a driver blade, a trigger, a push lever, a nose part, and a magazine. The accumulator chamber is provided in a handle. An air hose is connected to the handle, and compressed air is supplied from the air hose to the accumulator chamber. The nose part is attached to the main body, and the nose part has an injection path.

The magazine is attached to the nose part, and fasteners are housed in the magazine. A feeder is provided in the magazine. The feeder sends the fasteners housed in the magazine to the injection path. An operator operates the trigger and presses the push lever against a wood. By doing so, the driver blade operates by air pressure in the accumulator chamber and drives the fasteners in the injection path into the wood.

RELATED ART DOCUMENTS

Patent Documents

Patent Document 1: Japanese Patent No. 4618537

SUMMARY OF THE INVENTION

Problems to be Solved by the Invention

When the fastener is struck by the driver blade, its reaction is transmitted to the nose part. The inventors of the present application have recognized a problem in which if the nose part receives the reaction with the fastener not completely driven into the wood, the nose part may contact with the fastener.

An object of the present invention is to provide a driving device capable of suppressing contact of the nose part with the fastener due to the reaction caused by the striking part hitting the fastener.

Means for Solving the Problems

A driving device of one embodiment includes: a main body; a striking part movably supported by the main body; a handle protruding from the main body; and a nose part attached to the main body and holding a fastener before being hit by the striking part, the nose part having: an injection path movably accommodating the striking part and guiding the fastener; and an injection port provided in the injection path and firing the fastener, an opening extending from the injection port toward the handle being provided at the injection path on a side of the handle, and a width of the opening being larger than an outer diameter of a head of the fastener in a plan view perpendicular to a linear moving direction of the striking part.

Effects of the Invention

A driving device of one embodiment can suppress the contact of the nose part with the fastener due to the reaction caused by the striking part hitting the fastener.

DETAILED DESCRIPTION OF PREFERRED EMBODIMENTS

A typical one of several embodiments included in a driving device according to the present invention will be described with reference to the drawings.

Figure 1:
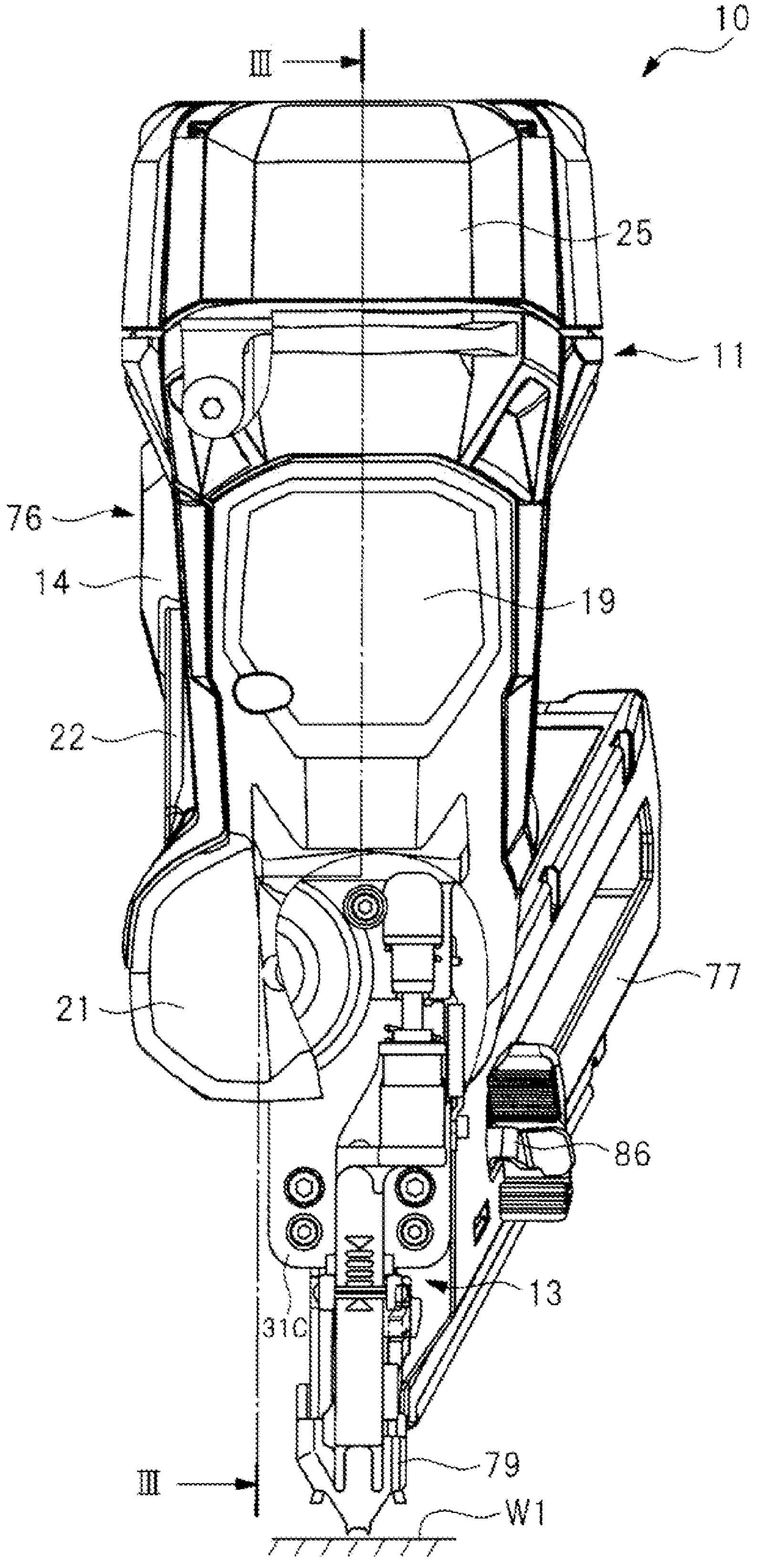
FIG. 1 is a front view showing a driving device which is one embodiment of the present invention.
Figure 2:
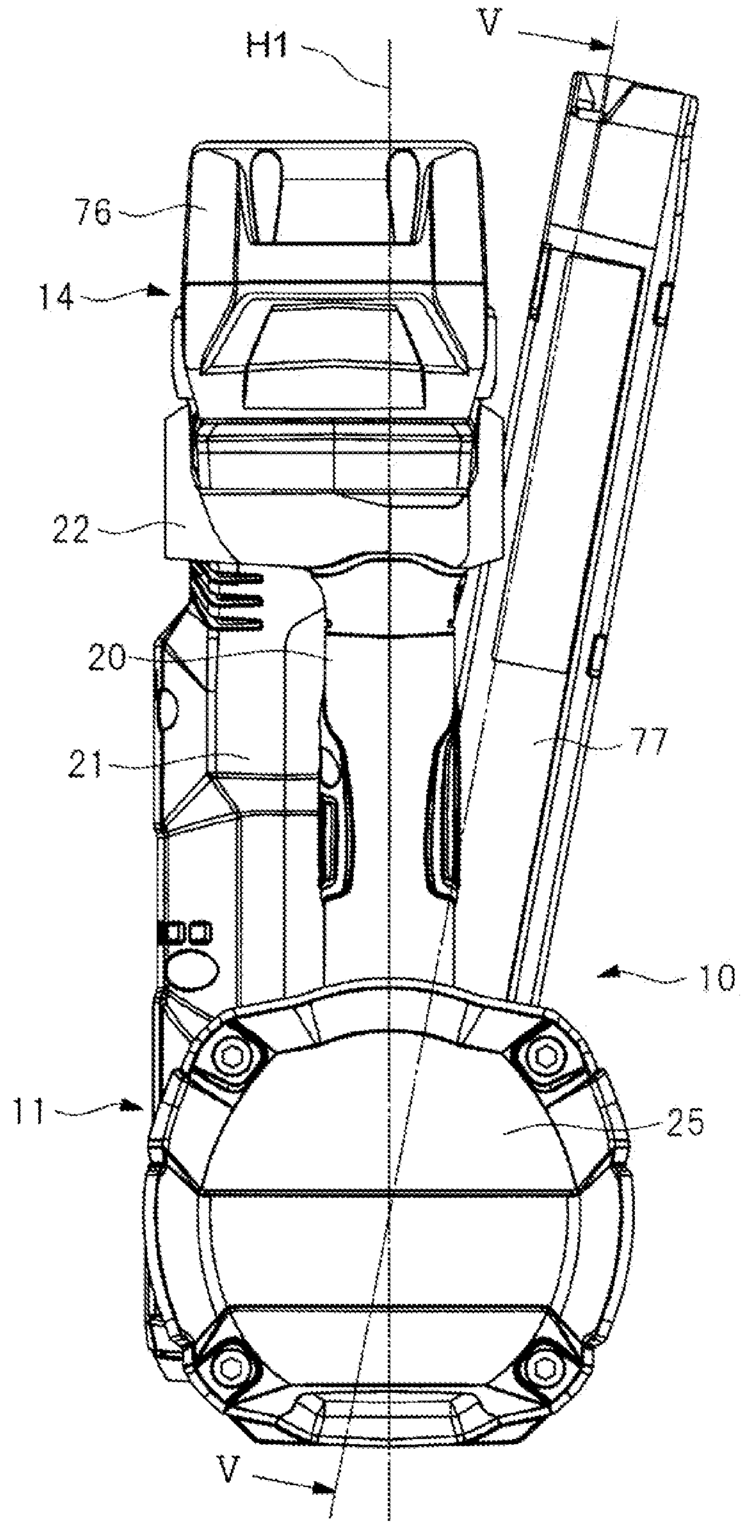
FIG. 2 is a top view showing the driving device.
Figure 3:
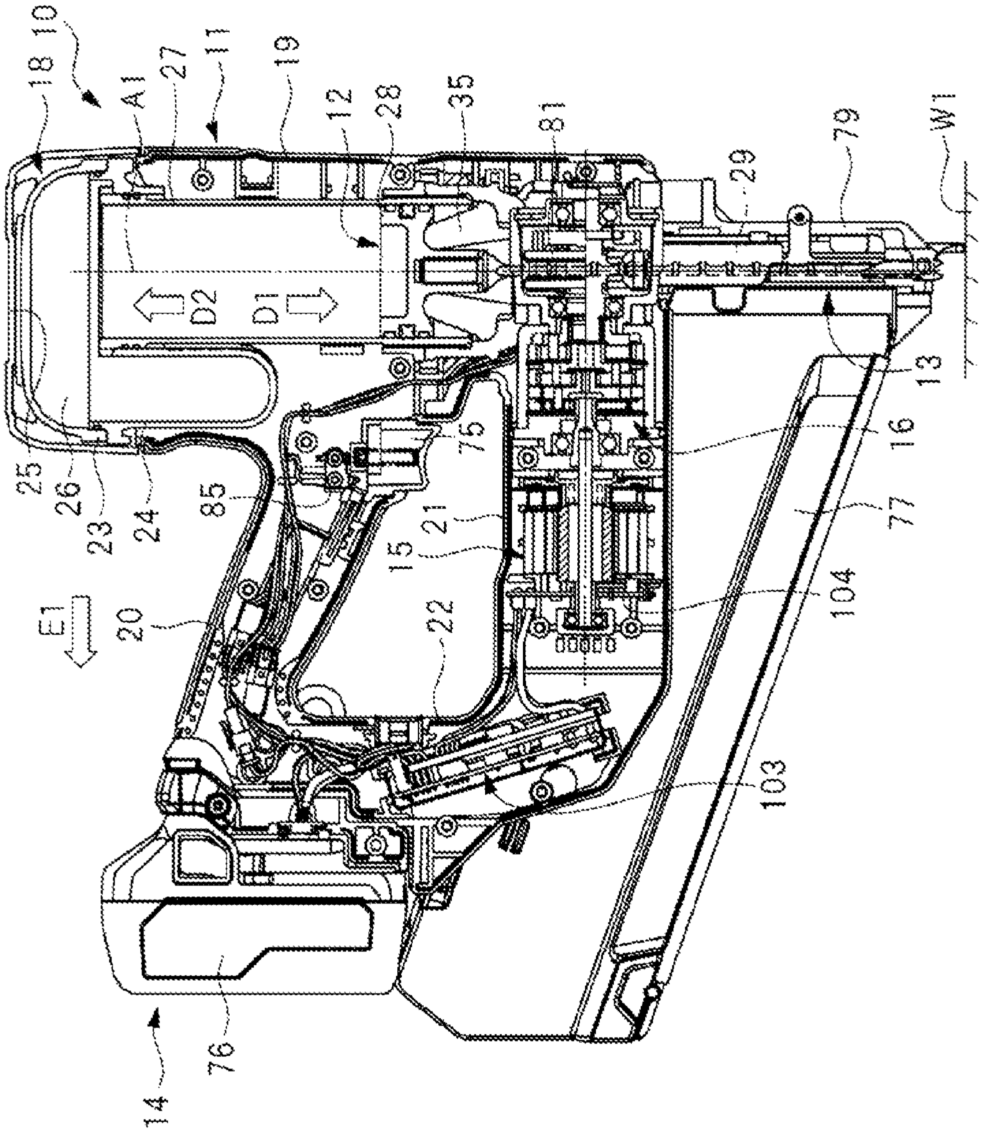
FIG. 3 is a side sectional view taken along line III-III of the driving device shown in FIG. 1.

A driving device 10 each shown in FIGS. 1, 2 and 3 is, for example, a fastener driving device. The driving device 10 includes a housing 11, a striking part 12, a nose part 13, a power supply unit 14, an electric motor 15, a speed reduction mechanism 16, and a pressure accumulator 18. The housing 11 has a cylinder case 19, a handle 20, a motor case 21, and an attaching portion 22. The cylinder case 19 has a cylindrical shape, and the handle 20 and the motor case 21 are connected to the cylinder case 19. The handle 20 projects from an outer surface of the cylinder case 19. The attaching portion 22 is connected to the handle 20 and the motor case 21.

The power supply unit 14 can be attached to and detached from the attaching portion 22. The electric motor 15 is arranged in the motor case 21. The pressure accumulator 18 has a cap 23 and a holder 24 to which the cap 23 is attached. A head cover 25 is attached to the cylinder case 19, and the pressure accumulator 18 is arranged across and inside the cylinder case 19 and the head cover 25.

A cylinder 27 is housed in the cylinder case 19. The cylinder 27 is made of metal, for example, aluminum or iron. The cylinder 27 is positioned in a direction along a central line A1 and in a radial direction thereof. The central line A1 is a center of the cylinder 27. As shown in FIG. 3, a direction E1 in which the handle 20 protrudes from the cylinder case 19 is a direction that intersects with the central line A1. The radial direction is a radial direction of a virtual circle centered on the central line A1. A pressure chamber 26 is formed across and in the pressure accumulator 18 and the cylinder 27. The pressure chamber 26 is filled with compressed gas. As the compressed gas, an inert gas is useable besides compressed air. The inert gas includes, as an examples, nitrogen gas and rare gas. In the present embodiment, an example in which the pressure chamber 26 is filled with compressed air will be described.

Figure 4:
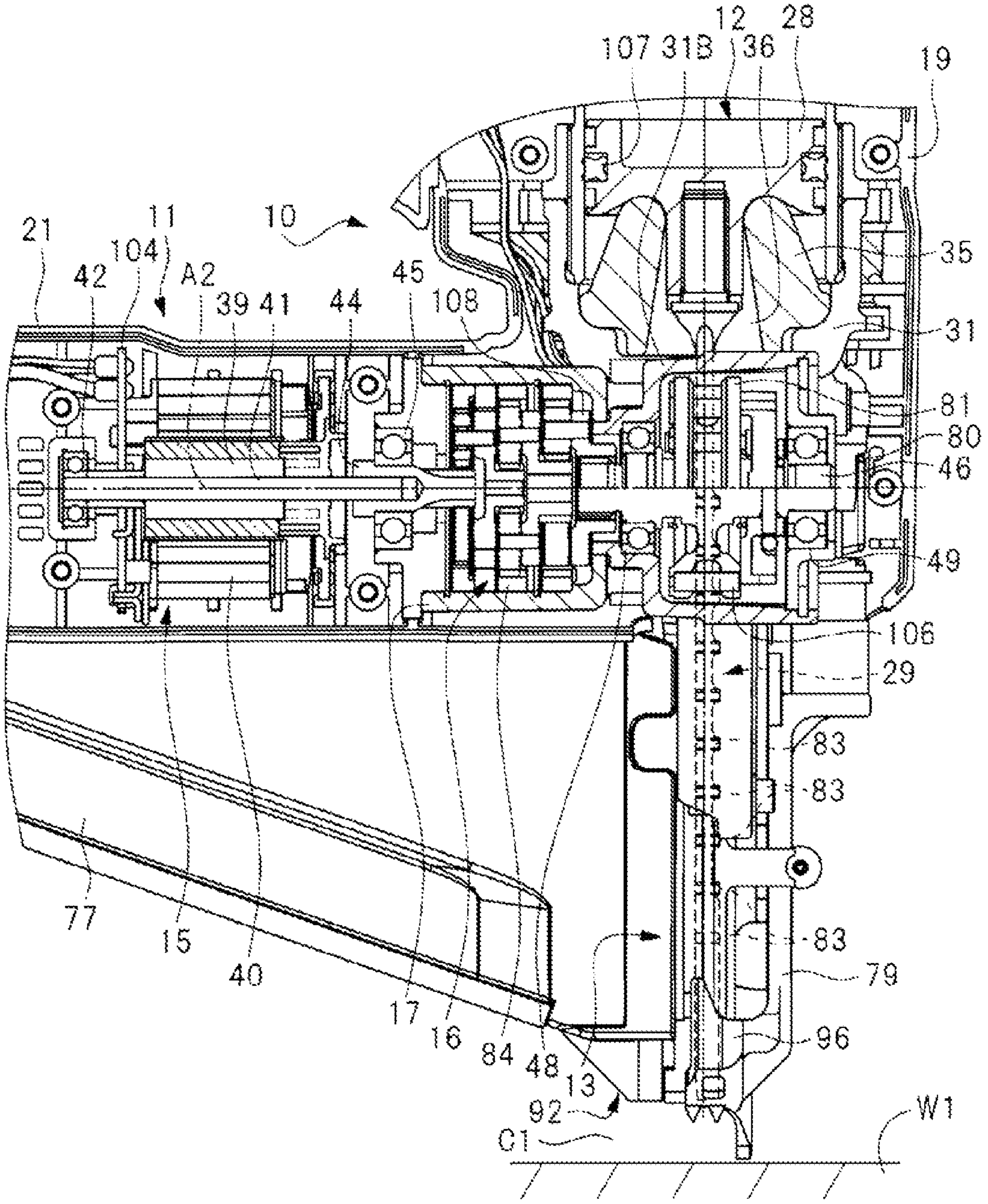
FIG. 4 is a partial side sectional view of the driving device shown in FIG. 3.

The striking part 12 is arranged over from an inside to an outside of the housing 11. The striking part 12 has a piston 28 and a driver blade 29. The piston 28 is operable in the cylinder 27 in the direction along the central line A1. An annular seal member 107 shown in FIG. 4 is attached to an outer peripheral surface of the piston 28. The seal member 107 contacts with an inner peripheral surface of the cylinder 27 to forma seal surface. The driver blade 29 is made of metal as an example. The piston 28 and the driver blade 29 are provided as separate members, and the piston 28 and the driver blade 29 are coupled to each other.

The nose part 13 is arranged outside the cylinder case 19. The nose part 13 is arranged so as to project from the cylinder case 19 in the direction along the central line A1. The nose part 13 is connected to a bumper support 31. The bumper support 31 has a bumper support portion 31A, a wheel case portion 31B, and a guide portion 31C shown in FIGS. 1 and 8. A gear case 17 is attached to the wheel case portion 31A. The bumper support portion 31A, the wheel case portion 31B, and the gear case 17 are arranged inside the housing 11. The bumper support portion 31A has a cylindrical shape.

A bumper 35 is arranged in the bumper support portion 31A. The bumper 35 may be made of any of synthetic rubber or silicon rubber. The bumper 35 has a guide hole 36. The driver blade 29 is movable in the guide hole 36. As shown in FIG. 3, the striking part 12 is movable linearly in a first direction D1 and a second direction D2 along the central line A1. The first orientation D1 and the second orientation D2 are opposite to each other. The first direction D1 is a direction in which the piston 28 approaches the bumper 35. The second direction D2 is a direction in which the piston 28 is separated from the bumper 35. The striking part 12 is always energized in the first direction D1 by gas pressure in the pressure chamber 26 shown in FIG. 1. An operation of the striking part 12 in the first direction D1 can be defined as descent. An operation of the striking part 12 in the second direction D2 can be defined as ascent.

As shown in FIG. 4, the electric motor 15 is arranged in the motor case 21. The electric motor 15 has a rotor 39 and a stator 40. The stator 40 is attached to the motor case 21. The rotor 39 is attached to a rotor shaft 41, and a first end portion of the rotor shaft 41 is rotatably supported by the motor case 21 via a bearing 42. The electric motor 15 is a brushless motor, and when a voltage is applied to the electric motor 15, the rotor 39 rotates about a central line A2. FIG. 3 shows an example in which the central line A1 and the central line A2 intersect with each other, for example, at an angle of 90 degrees. The central line A1 and the central line A2 may intersect at an angle different from 90 degrees. Further, in FIG. 3 which is a side view of the driving device 10, the direction E1 is parallel to the central line A2.

The gear case 17 has a cylindrical shape. The speed reduction mechanism 16 is provided in the gear case 17. The speed reduction mechanism 16 includes a plurality of sets of planetary gear mechanisms. An input element of the speed reduction mechanism 16 is coupled to the rotor shaft 41 via a power transmission shaft 44. The power transmission shaft 44 is rotatably supported by a bearing 45.

A rotational shaft 46 is provided in the wheel case portion 31B. The rotational shaft 46 is rotatably supported by bearings 48, 49. The rotor shaft 41, the power transmission shaft 44, the speed reduction mechanism 16, and the rotational shaft 46 are arranged concentrically with the central line A2 as a center. An output element 108 of the speed reduction mechanism 16 and the rotational shaft 46 are arranged concentrically, and the output element 108 and the rotational shaft 46 rotate integrally. The speed reduction mechanism 16 is arranged in the power transmission path from the electric motor 15 to the rotational shaft 46.

A wheel 81 is provided in the wheel case portion 31B. The wheel 81 is attached to the rotational shaft 46. A plurality of pins 106 are provided in the wheel 81. The plurality of pins 106 are arranged at intervals in a rotational direction of the wheel 81.

A plurality of protrusions 83 are provided on the driver blade 29. The plurality of protrusions 83 are arranged at intervals in an operating direction of the driver blade 29. When the wheel 81 rotates forward by a rotative force of the electric motor 15, the pin 106 can independently be engaged with and disengaged from the protrusion 83. When the wheel 81 rotates forward and the pin 106 is engaged with the protrusion 83, the striking part 12 ascends. When the pin 106 is disengaged from the protrusion 83, the striking part 12 descends by pressure in the compressed air.

As shown in FIG. 4, a lock member 84 is provided in the gear case 17. The lock member 84 can be engaged with and disengaged from any one of rotating elements of the speed reduction mechanism 16. When the lock member 84 is disengaged from the rotating element, the rotational shaft 46 can rotate forward due to a rotative force caused by the electric motor 15 rotating forward. When an operating force for descending the striking part 12 is transmitted to the wheel 81 after the lock member 84 is engaged with the rotating element, the lock member 84 suppresses reverse rotation of the rotational shaft 46.

As shown in FIG. 3, a trigger 75 and a trigger switch 85 are provided in the handle 20. An operator grasps the handle 20 by hand and applies or releases an operating force to or from the trigger 75. The trigger switch 85 detects presence or absence of the operating force applied to the trigger 75, and outputs a signal according to a detected result.

The power supply unit 14 has an accommodating case 76 and a plurality of battery cells housed in the accommodating case 76. The battery cell is a secondary battery that can be charged and discharged, and a known battery cell such as a lithium ion battery, a nickel hydrogen battery, a lithium ion polymer battery, or a nickel cadmium battery can be arbitrarily used as the battery cell.

Further, a magazine 77 is provided as shown in FIGS. 1, 2, 3, 4, and 5, and the magazine 77 is supported by the nose part 32 and the attaching portion 22. The fasteners 78 are housed in the magazine 77. As shown in FIG. 1, a feeder 86 is provided in the magazine 77. The feeder 86 sends the fastener 78 in the magazine 77 to the nose part 13. A push lever 79 is attached to the nose part 13. The push lever 79 is operatable within a predetermined range in the direction along the central line A1 with respect to the nose part 13. As shown in FIG. 4, an elastic member 80 for energizing the push lever 79 in the direction along the central line A1 is provided. The elastic member 80 is, as an example, a metal spring, and the elastic member 80 energizes the push lever 79 in a direction away from the cylinder case 19. The push lever 79 contacts with a stopper, thereby stopping.

Figure 5:
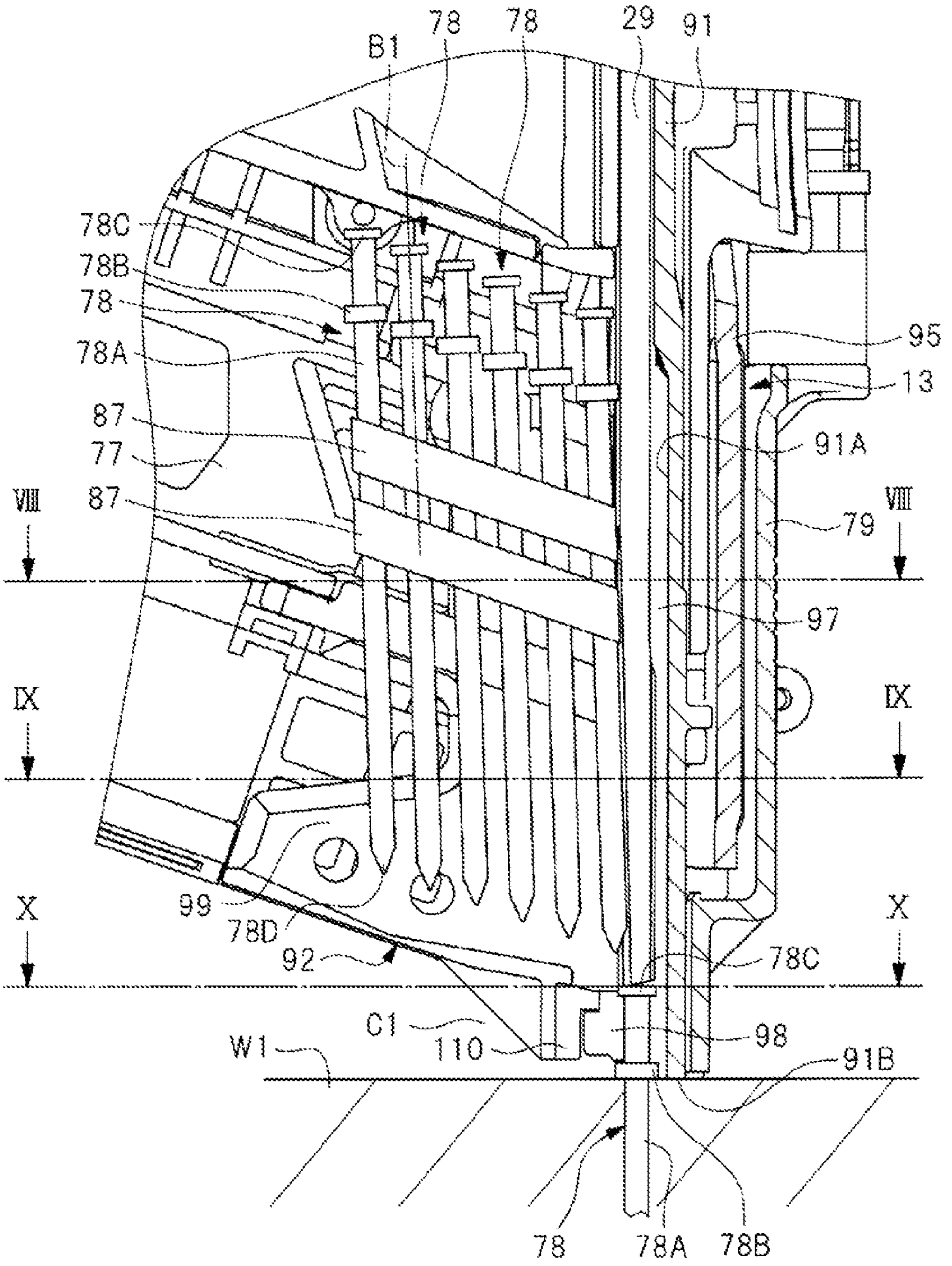
FIG. 5 is a side sectional view taken along line V-V of the driving device and a magazine shown in FIG. 2.
Figure 7:
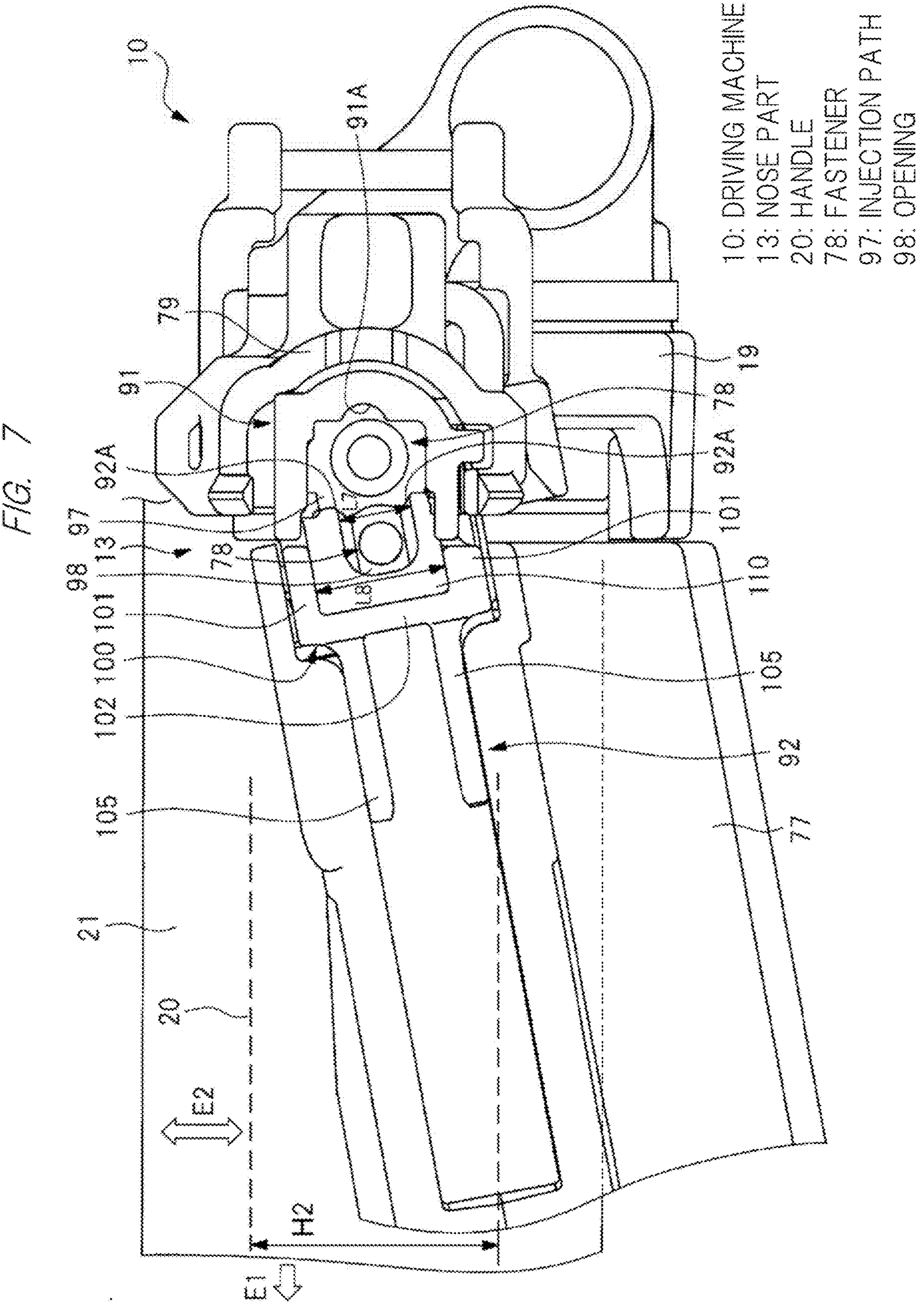
FIG. 7 is a bottom view of the nose part and the magazine shown in FIG. 4.

The magazine 77 is provided so as to protrude from the nose part 13. When the nose part 13 is viewed in a bottom view as shown in FIG. 7, a part of an arrangement region of the magazine 77 and a part of an arrangement region of the handle 20 overlap. When the driving device 10 is viewed in a plan view as shown in FIG. 2, the magazine 77 extends from the nose part 13 in a direction intersecting with an extending direction of the handle 20. In the plan view of FIG. 2, the magazine 77 is arranged so as to be separated from the handle 20 as being separate from the nose part 13; the arrangement region of the magazine 77 and an arrangement region of the battery 14 do not overlap; and the part of the arrangement region of the handle 20 and a part of an arrangement region of the motor case 21 overlap. As shown in FIG. 5, the magazine 77 can accommodate a plurality of fasteners 78 in a state of being arranged in a row. A connecting element 87 for connecting the plurality of fasteners 78 to each other is further provided. The connecting element 87 may be made of any of a synthetic resin, a paper, or metal.

The fastener 78 exemplified in the present embodiment is an element that is temporarily fixed to an object W1. The fastener 78 is made of metal as an example, and the fastener 78 has a shaft portion 78A, a first head 78B, and a second head 78C. The second head 78C is located behind the first head 78B in a direction in which the fastener 78 is driven into the object W1. An outer diameter of the shaft portion 78A is constant. An outer diameter of the first head 78B is larger than an outer diameter of the second head 78C, and the outer diameters of the first head 78B and the second head 78C are larger than an outer diameter of the shaft portion 78A.

Figure 6:
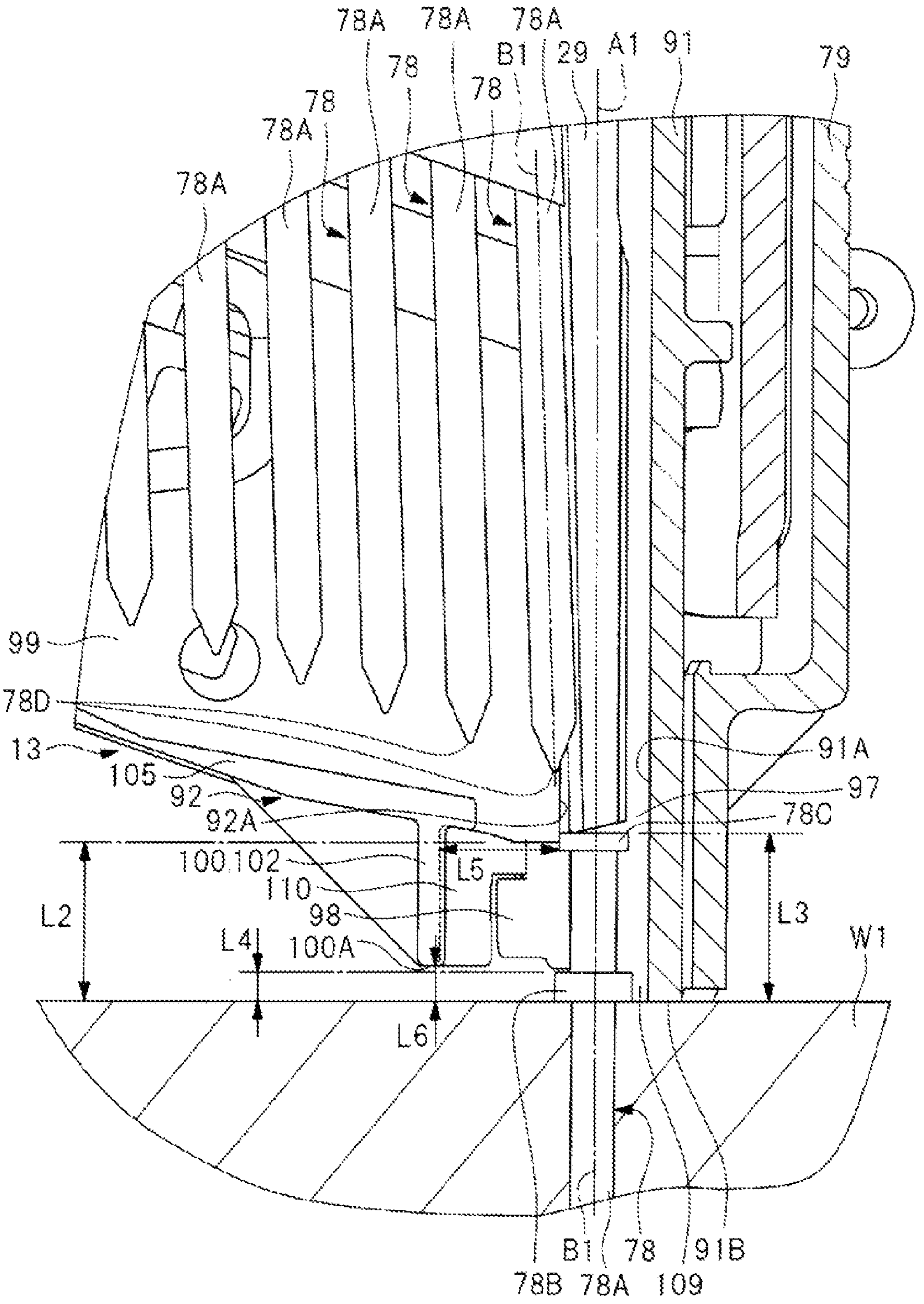
FIG. 6 is an enlarged side sectional view of a tip of a nose part shown in FIG. 5.
Figure 10:
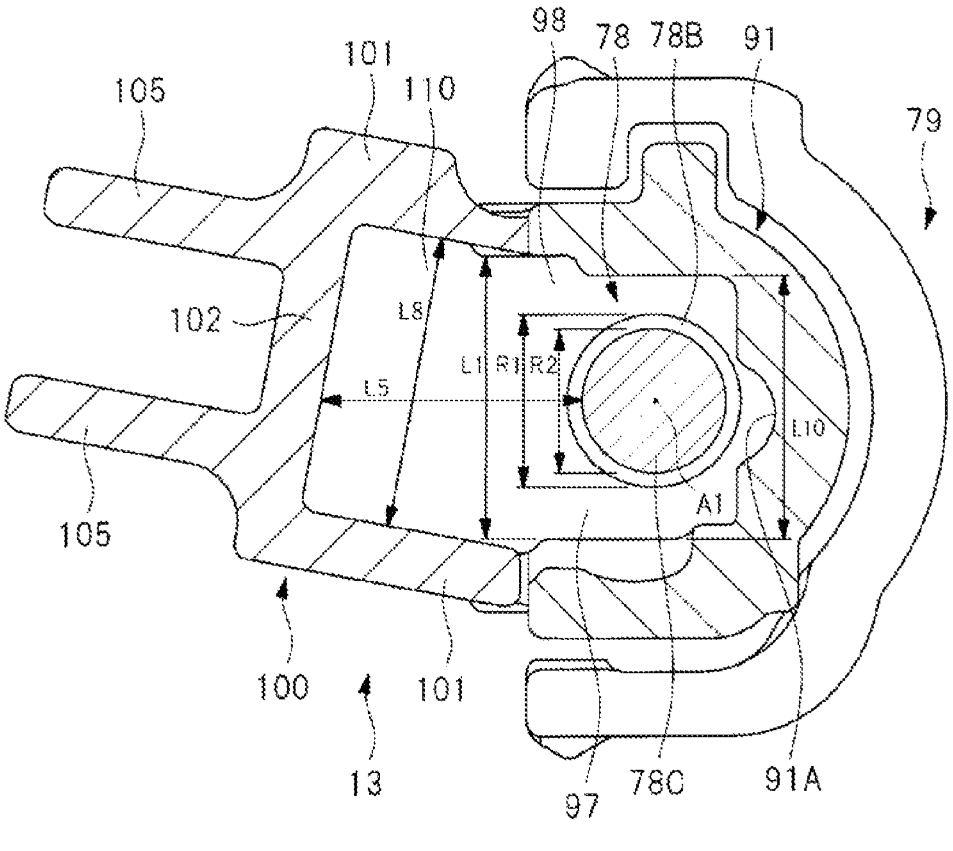
FIG. 10 is a plan sectional view taken along line X-X of the driving device shown in FIG. 5.

As shown in FIG. 10, the first head 78B has an outer diameter R1 and the second head 78C has an outer diameter R2. The first head 78B is provided between a tip 78D of the shaft portion 78A and the second head 78C in a direction along a central line B1 of the fastener 78 shown in FIG. 5. The second head 78C is provided at a back end of the shaft portion 78A. As shown in FIG. 6, the fastener 78 has a second length L3 from the first head 78B to the second head 78C in the direction along the central line B1. The second length L3 is the maximum value of a length from the first head 78B to the second head 78C in the direction along the central line B1. The first head 78B has a third length L4 in the direction along the central line B1. An opening 98 has a length L5 from the second head 78C to a later-described connecting plate 102 in a direction along a handle axis line H1.

As shown in FIG. 1, the feeder 86 is provided in the magazine 77, and the feeder 86 energizes the plurality of fasteners 78 shown in FIG. 5 in a direction intersecting with the central line B1. The fastener 78, which is located at a head, among the plurality of energized fasteners 78 reaches the nose part 13.

Figure 8:
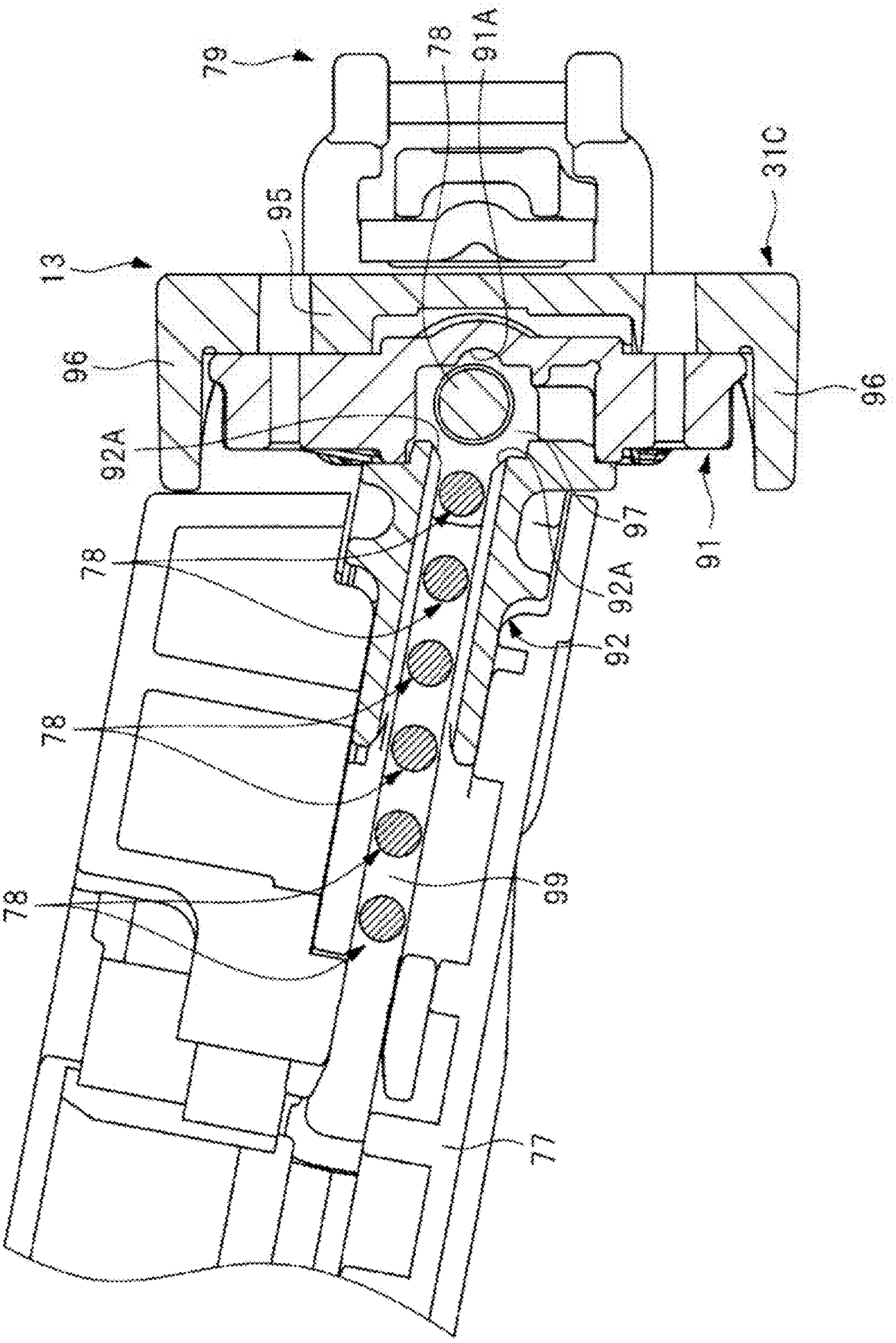
FIG. 8 is a plan sectional view taken along line VIII-VIII of the driving device shown in FIG. 5.
Figure 9:
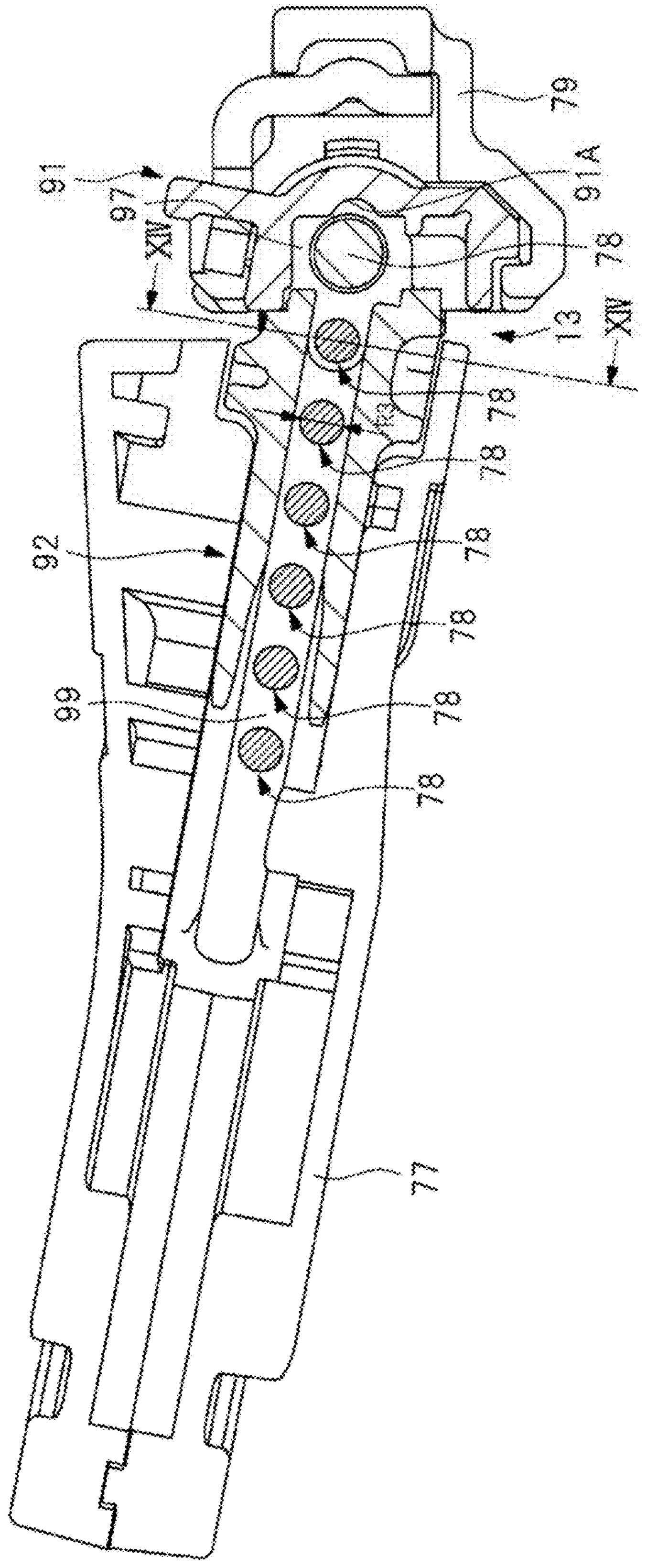
FIG. 9 is a plan sectional view taken along line IX-IX of the driving device shown in FIG. 5.

The nose part 13 is caused to approach the object W1 by the operator. The nose part 13 determines an operating direction of the driver blade 29, and determines a posture and a driving direction of the fastener 78. As shown in FIGS. 7, 8 and 9, the nose part 13 has a guide portion 31C, a blade guide 91, and a guide plate 92. The guide portion 31C, the blade guide 91, and the guide plate 92 are fixed to the housing 11 by fixing elements, respectively. Incidentally, an illustration of the driver blade 29 is omitted in FIGS. 8 and 9.

As shown in FIG. 8, the guide portion 31C has a base 95 and two side walls 96 connected to the base 95. The blade guide 91 is located between the two side walls 96 and is caused to contact with the base 95. The blade guide 91 and the guide plate 92 are arranged alongside in a direction in which the magazine 77 protrudes from the nose part 13. The blade guide 91 is arranged between the base 95 and the guide plate 92. The magazine 77 is attached to the guide plate 92. It is arranged in the magazine 77. A supply path 99 is provided across the magazine 77 and the guide plate 92. The fastener 78 is sent from the supply path 99 to an injection path 97 by the feeder 86.

The injection path 97 is formed between the blade guide 91 and the guide plate 92. The injection path 97 connects with the supply path 99 and the guide hole 36. The injection path 97 may be any one of a space, a recess, a passage, or a gap in the direction along the central line A1. The injection path 97 is a passage through which the driver blade 29 and the fasteners 78 are movable in the direction along the central line A1. When the striking part 12 is activated, the driver blade 29 moves in the direction along the central line A1 in the injection path 97. The driver blade 29 can hit the fastener 78.

As shown in FIG. 6, in the operating direction of the driver blade 29, the tip 91B of the blade guide 91 protrudes from a tip 100A of the guide plate 92. In other words, a length L6 is formed from the tip 91B of the blade guide 91 to the tip 100A of the guide plate 92 in the direction along the central line A1. As shown in FIGS. 7 and 10, the blade guide 91 has an opening 98. The opening 98 is obtained by notching a part of the blade guide 91. As shown in FIG. 5, the opening 98 connects with the injection path 97 and an outside C1 of the nose part 13. The opening 98 is provided at a position of the blade guide 91 closest to the guide plate 92. The handle 20 is arranged over a range H2 in a direction E2 that intersects with a direction E1. In an example of FIG. 7, the direction E1 and the direction E2 intersect at an angle of about 90 degrees. Then, the opening 98 is arranged in the range H2 in the direction E2. As shown in FIG. 10, a width L1 of the opening 98 is larger than the outer diameter R2 of the second head 78C. A portion of the injection path 97 corresponding to the tip of the nose part 13 is an injection port 109. The width L1 of the opening 98 is larger than a width L10 in a direction orthogonal to the central line A1 and an axis line H1 of the handle 20 in the injection path 97 formed by the blade guide 91 that guides the fastener 78. The width L1 of the opening 98 is shorter than, for example, 2.5 times of the outer diameter R2. Further, the width L1 is sufficiently larger than a width L7 of a second guide portion 92A described later.

The blade guide 91 has a first guide portion 91A shown in FIGS. 8, 9 and 10. The first guide portion 91A is, for example, a wall surface provided in the direction along the central line A1. The wall surface is curved in a plane perpendicular to the operating direction of the striking part 12. The first guide portion 91A determines a posture of the fastener 78 by contacting with the shaft portion 78A of the fastener 78. The guide plate 92 has a second guide portion 92A. The second guide portion 92A is, for example, two wall surfaces provided in the direction along the central line A1. The posture of the fastener 78 is determined by contacting with the second guide portion 92A and the second head 78C of the fastener 78. A width in a direction orthogonal to a central line A1 of the second guide portion 92A, which is the two wall surfaces, is a width L7. The width L7 is smaller than the outer diameter R1 of the first head 78B and the outer diameter R2 of the second head 78C of the fastener 78.

As shown in FIG. 6, an arrangement range of the first guide portion 91A and an arrangement range of the second guide portion 92A are different in the operating direction of the driver blade 29. As an example, an amount of protrusion from an end of the second guide portion 92A to an end of the first guide portion 91A is a first length L2. In the operating direction of the driver blade 29, the first length L2 is equal to or less than a second length L3. Further, the first length L2 is longer than a third length L4 of the fastener 78. Furthermore, as described above, in the operating direction of the driver blade 29, the tip 91B of the blade guide 91 protrudes by a length L6 from a head of the tip 100A of the guide plate 92, for example, is configured so as to be longer 0.1 times than a diameter R3 of the shaft portion 78A of the fastener 78. In addition, the length L6 is configured so as to be shorter than, for example, the diameter R3 of the shaft portion 78A of the fastener 78.

Figure 13:
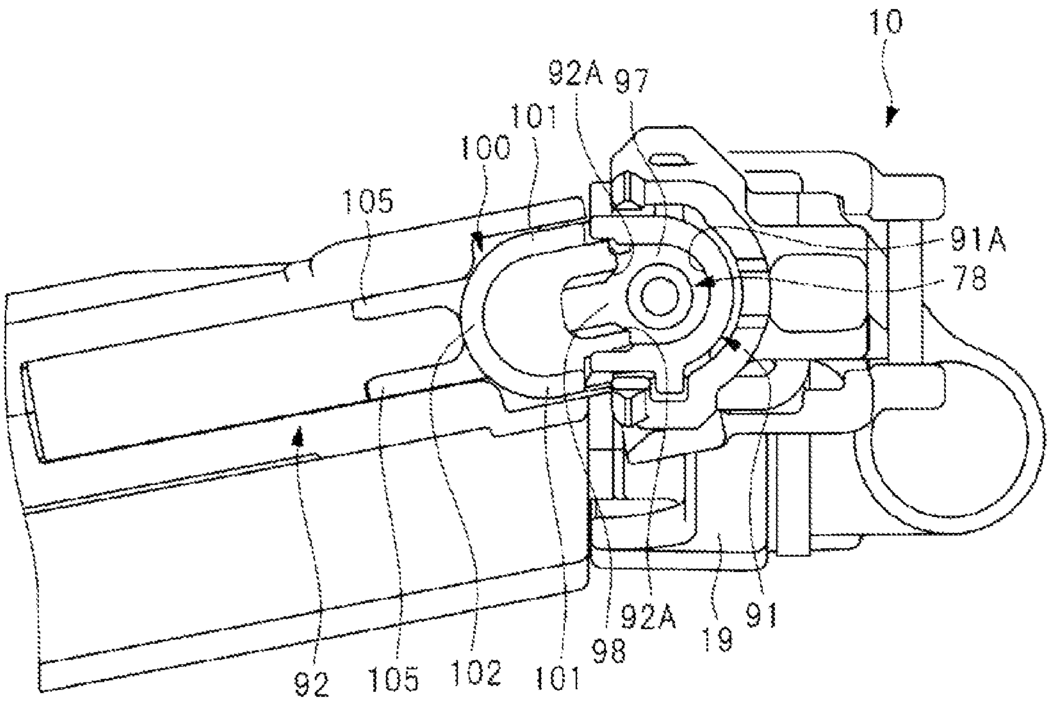
FIG. 13 is a bottom view showing another example in which a shape of the magazine of FIG. 7 is changed.
Figure 14:
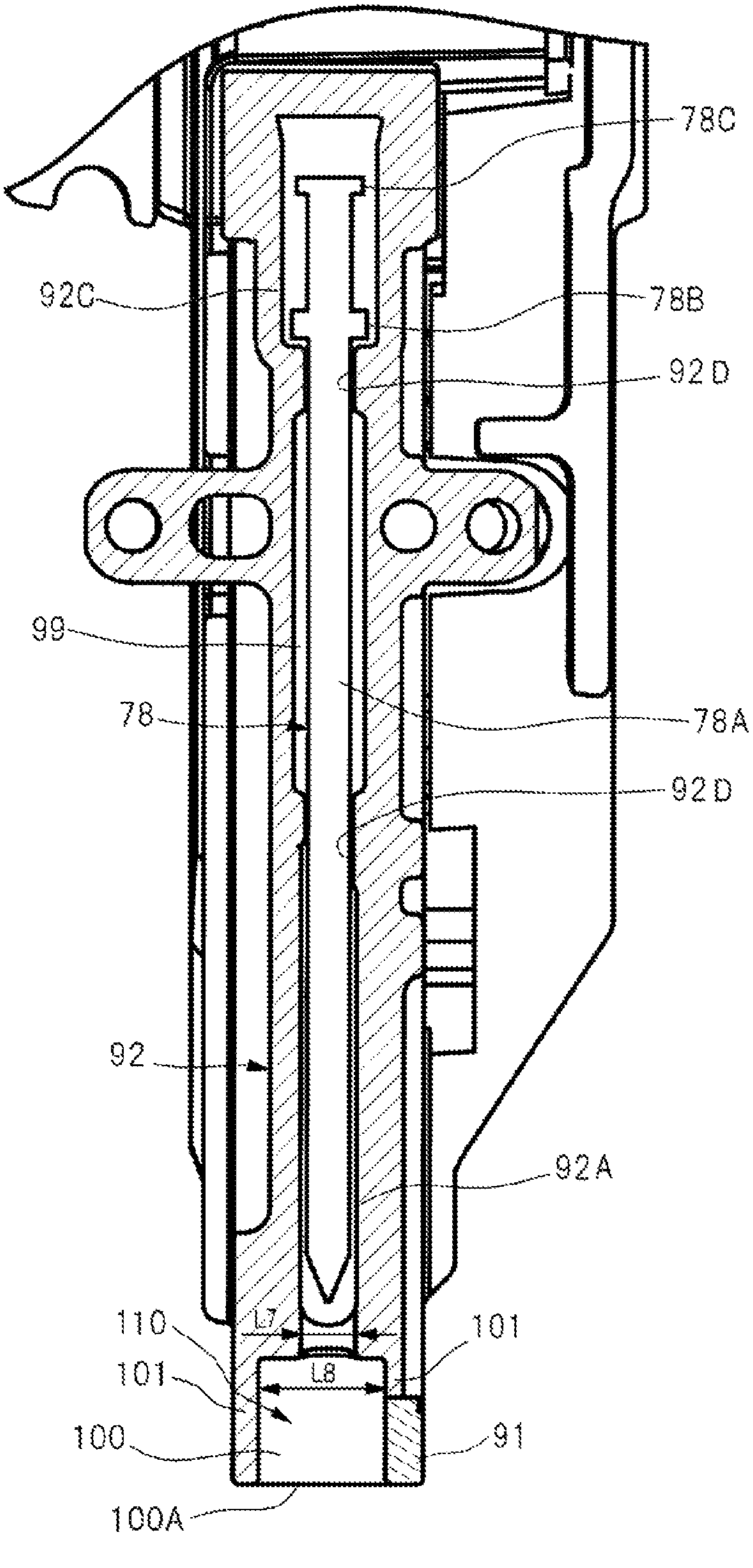
FIG. 14 is a front sectional view taken along line XIV-XIV of the driving device shown in FIG. 9.

As shown in FIG. 7, the guide plate 92 has a wall 100. The wall 100 is arranged in the direction along the central line A1. The wall 100 has two side plates 101, 101, which are arranged mutually in parallel, and a connecting plate 102. The connecting plate 102 connects the side plate 101 and the side plate 101. As shown in FIGS. 7 and 13, when the nose part 13 is viewed in a bottom view, the two side plates 101 and the connecting plate 102 each have a substantially linear shape. A width between the two side plates 101 is a width L8, and is larger than the width L7 which is the width of the second guide portion 92A serving as two wall surfaces. FIG. 14 is a sectional view of the guide plate 92 of the nose part 13 as viewed from an injection path 97 side, and shows a state in which the fastener 78 is located in a supply path 99. As shown in FIG. 14, a third guide portion 92C in which the first head 78B and the second head 78C are guided has a larger width than that of the second guide portion 92A that guides the shaft portion 78A. Meanwhile, in order to guide the posture of the fastener 78 at a plurality of places in the passage of the fastener 78, a fourth guide portion 92D narrower than the second guide portion 92A is provided along a feeding direction of the fasteners. Further, the width L8 between the side plates 101, 101 of the opening 98 has a large width with respect to the second guide portion 92A and the third guide portion 92C. The width L8 is configured so as to be, for example, longer 1.5 times than the width L7. Furthermore, the width L8 is configured so as to be, for example, shorter three times than the width L7. Incidentally, as shown in FIGS. 7 and 10, since the magazine 77 is attached to the nose part 13 aslant with respect to the axis line H1 of the handle 20, the two side plates 101 and the connecting plate 102 are arranged aslant in the same direction as that of the magazine 77 with respect to the axis shaft H1 of the handle 20. The second head 78C of the fastener 78 and the connecting plate 102 each have a length L5 in a direction along the axis line H1 of the handle 20. Since the wall 100 is arranged so as to incline with respect to the nose part 13, a place of the connecting plate 102 that coincides with the second head 78C of the fastener 78 in the direction along the axis line H1 is arranged so as to be separate from the fastener 78. In other words, the length L5 when the wall 100 is inclined is longer than the length L5 when the wall 100 is not inclined. The length L5 is, for example, more 0.4 times than the second length L3, preferably, more 0.5 times than the second length L3. Furthermore, the length L5 is, for example, shorter 1.0 time than the second length L3. Moreover, the length L5 is longer than the outer diameter R2 of the second head 78C of the fastener 78, and is further longer twice than a shaft diameter R3. In addition, the length L5 is longer 0.5 times than and shorter 1.2 times than the width L8 between the side plates 101, 101. The width L8 is longer than the width L10 of the injection path 97, and is further configured to be substantially equal to or longer than the width L1. As shown in FIG. 6, the tip 100A of the guide plate 92 in the direction along the central line A1 can be defined as a tip of the wall 100. The guide plate 92 has a rib 105, and the rib 105 is connected to the wall 100. A space 110 is provided between the two side plates 101 and the connecting plate 102. The space 110 connects with the opening 98 and the outside C1. In the cross-section shown in FIG. 6, the wall 100 including the connecting plate 102 is connected to a lower surface of the rib 105 on a side away from the injection port 109 from an end portion on an injection port 109 side.

Figure 12:
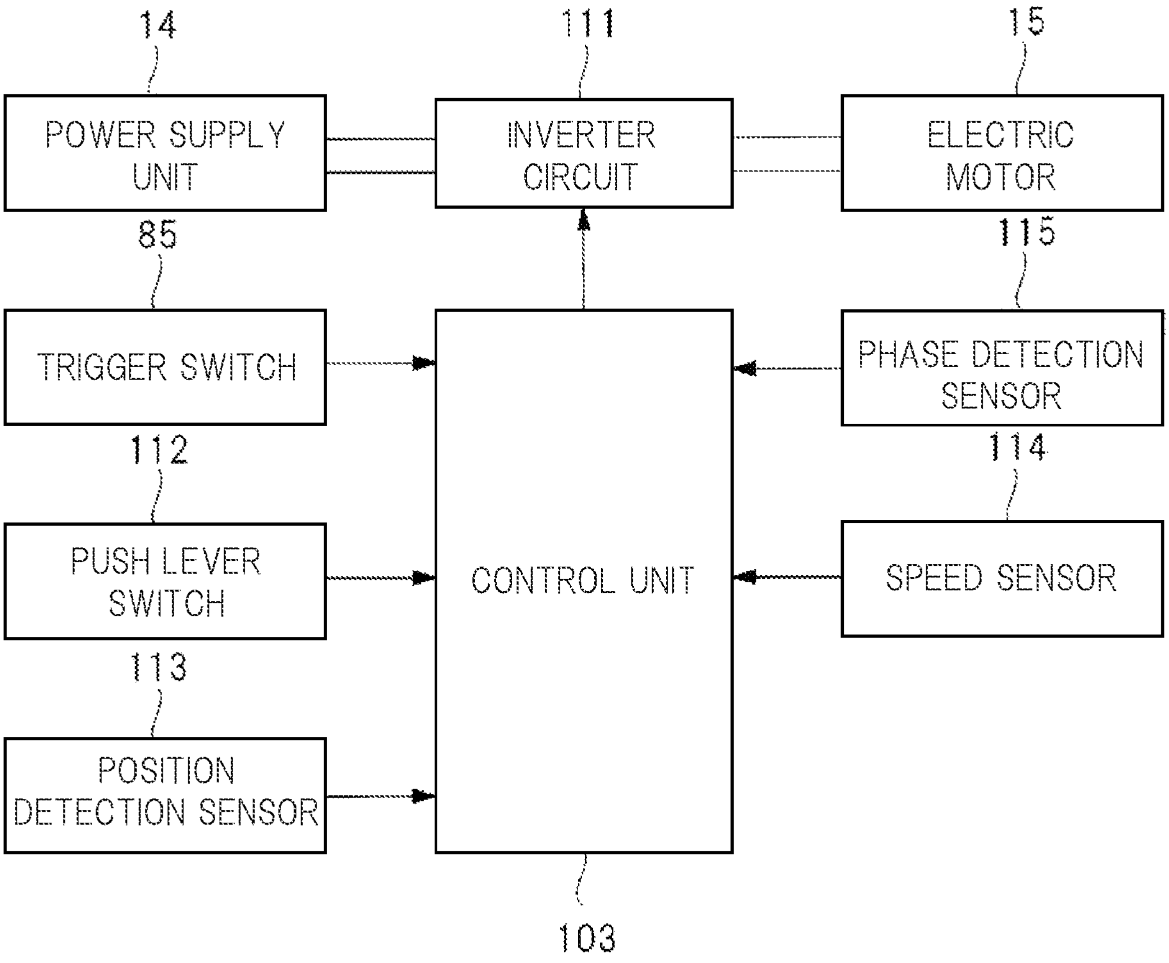
FIG. 12 is a block diagram showing a control system of the driving device.

The control circuit 103 shown in FIG. 12 is provided over and in the attaching portion 22 and the motor case 21. The control circuit 103 has a microprocessor. The microprocessor has an input/output interface, an arithmetic processing unit, and a storage unit. Further, a motor board 104 is provided in the motor case 21. An inverter circuit 111 is provided on the motor board 104. The inverter circuit 111 connects and disconnects a stator 40 of the electric motor 15 and a power supply unit 14. The inverter circuit 111 includes a plurality of switching elements, and the plurality of switching elements can be turned on and off respectively. The control circuit 103 and the inverter circuit 111 are connected by a signal cable. The control circuit 103 controls rotation and stop of the electric motor 15, a rotational speed of the electric motor 15, and a rotational direction of the electric motor 15 by controlling the inverter circuit 111.

Further, a push lever switch 112 is provided in the nose part 13, and a position detection sensor 113 is provided in the housing 11. The push lever switch 112 is turned out when the push lever 79 is pressed against the object W1. The push lever switch 112 is turned off when the push lever 79 is separated from the object W1. A position detection sensor 113 detects a position of a wheel 81 in a rotational direction, and outputs a signal. The push lever switch 112 and the position detection sensor 113 are connected to the control circuit 103 by a signal cable. The control circuit 103 processes the signal of the position detection sensor 113 to detect a position of the striking part 12 in a central-line A1 direction. Furthermore, a speed sensor 114 for detecting a rotation speed of a rotor 39 of the electric motor 15 and a phase sensor 115 for detecting a phase in a rotational direction of the rotor 39 are provided. The speed sensor 114 and the phase sensor 115 are each connected to the control circuit 103 by a signal cable.

The signals outputted from the trigger switch 85, the push lever switch 112, the position detection sensor 113, the phase sensor 115, and the speed sensor 114 are inputted to the control circuit 103. The control circuit 103 processes the inputted signals to control the inverter circuit 111. In this way, the control circuit 103 controls the stop, rotation, rotational direction, and rotational speed of the electric motor 15.

An example of using the driving device 10 is as follows. When the control circuit 103 detects at least one of the push lever 79 being separated from the object W1 and an operating force onto the trigger 75 being released, the control circuit 103 causes the electric motor 15 to be stopped. When the electric motor 15 is stopped, the striking part 12 is stopped at a standby position. Here, described will be an example in which the standby position of the striking part 12 is a state in which the piston 28 is separated from the bumper 35.

Any pin 106 of the plurality of pins 106 provided on the wheel 81 is engaged with the protrusion 83. Pressure of the compressed air in the pressure chamber 26 is constantly applied to the striking part 12, and the striking part 12 is energized in a descending direction. The operating force in a direction in which the striking part 12 is about to descend is transmitted to the wheel 81. A lock member 84 suppresses the rotation of the wheel 81 in a reverse direction. According to such a principle, the striking part 12 is stopped at the standby position. When the striking part 12 is stopped at the standby position, a part of the driver blade 29 is located in the injection path 97. A head fastener 78 of the plurality of fasteners 78 contacts with the driver blade 29 and is stopped in the supply path 99.

When the operator applies an operating force to the trigger 75 and presses the push lever 79 against the object W1 to operate the push lever 79, the tip 91B of the blade guide 91 contacts with the object W1 as shown in FIGS. 5 and 6. Then, the control circuit 103 processes the inputted signals to rotate the electric motor 15 in a positive (forward) direction. The rotative force of the electric motor 15 is transmitted to the rotational shaft 46 via the speed reduction mechanism 16. Thereafter, the rotational shaft 46 and the wheel 81 rotate in the positive direction, and the striking part 12 rises (ascends) from the standby position. When the striking part 12 rises, the pressure of the compressed air in the pressure chamber 26 ascends. The speed reduction mechanism 16 sets the rotational speed of the wheel 81 to be lower than the rotational speed of the electric motor 15.

When the striking part 12 rises from the standby position, the head fastener 78 enters the injection path 97 from the supply path 99. The shaft portion 78A contacts with the first guide portion 91A, and the fastener 78 stops in the injection path 97. The central line B1 of the fastener 78 is inclined with respect to the central line A1.

When the wheel 81 rotates in the positive direction and all the pins 106 are released from all the protrusions 83, the striking part 12 goes down (descends) by the pressure of the compressed air in the pressure chamber 26. A position of the striking part 12 at the time when all the pins 106 are released from all the protrusions 83 is a top dead center. The striking part 12 goes down, and the tip of the driver blade 29 collides with the second head 78C of the fastener 78 located in the injection path 97. Then, the fastener 78 moves along the central line A1 and the connecting element 87 is broken. When the fastener 78 hit by the driver blade 29 moves, the first guide portion 91A contacts with the shaft portion 78A and the second guide portion 92A contacts with the second head 78C, so that the posture of the fastener 78 is determined. That is, the central line B1 of the fastener 78 and the central line A1 substantially become a straight line (aligned).

After the shaft portion 78A of the fastener 78 bites into the object W1, the first head 78B collides with the object W1 as shown in FIG. 6. The fastener 78 stops with the first head 78B and the second head 78C exposed from the object W1. At this point of time, the striking part 12 has not reached a bottom dead center. When the fastener 78 stops, the striking part 12 receives a reactive force and the housing 11 moves by the reactive force. Therefore, the tip of the nose part 13, that is, the tip 91B of the blade guide 91 is separated from the object W1. Moreover, the push lever 79 is separated from the object W1, and the push lever switch 112 is turned off. Furthermore, the piston 28 collides with the bumper 35, and the bumper 35 absorbs a part of striking energy.

A position where the piston 28 contacts with the bumper 35 is a bottom dead center of the striking part 12. The control circuit 103 rotates the electric motor 15 even after the striking part 12 reaches the bottom dead center. The striking part 12 is ascended (gone up) from the bottom dead center. When the control circuit 103 detects that the push lever switch 112 is turned off and the striking part 12 has reached the standby position, the control circuit 103 stops the electric motor 15.

Figure 11:
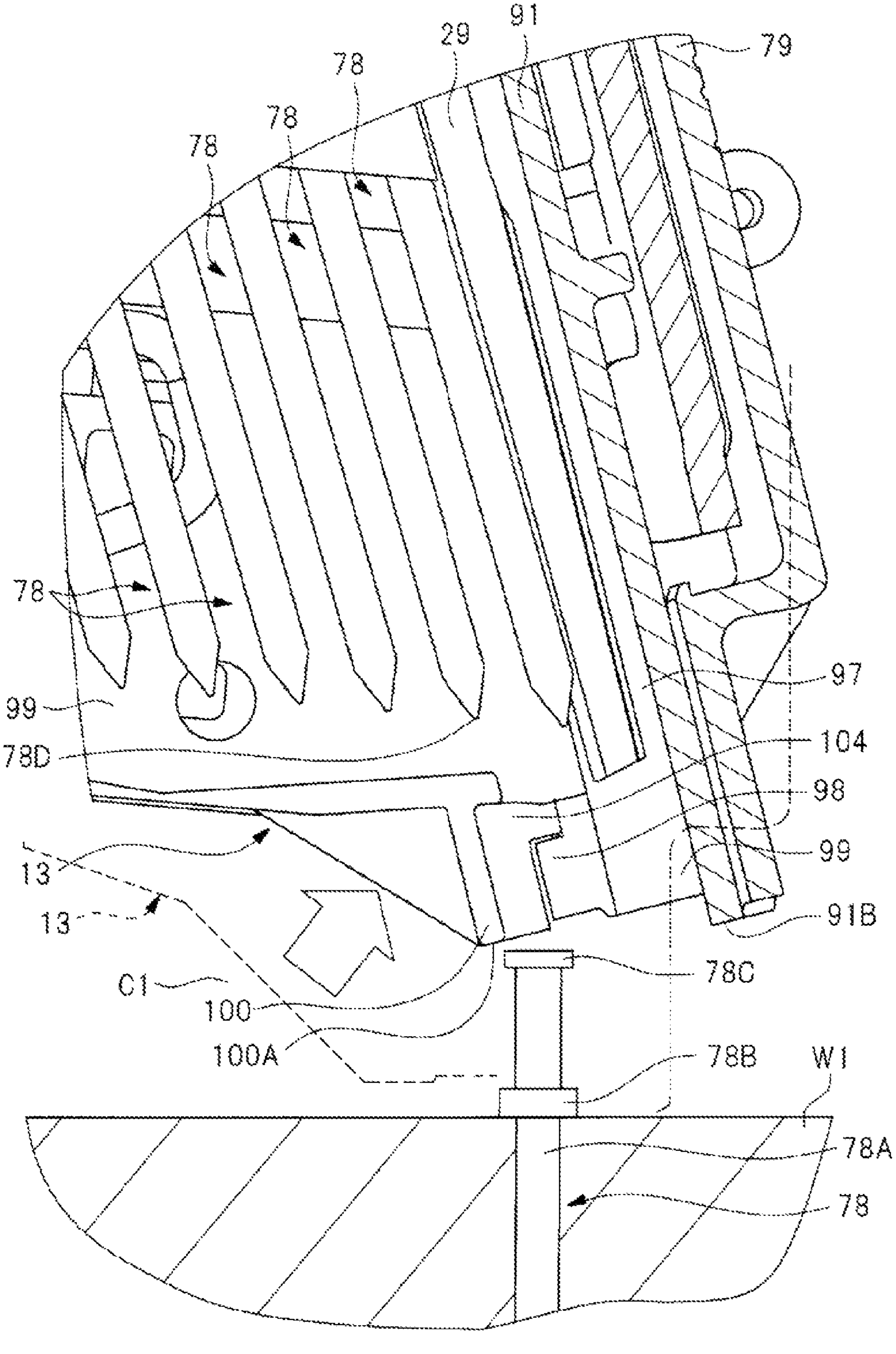
FIG. 11 is a side sectional view showing an example in which the nose part moves due to reaction caused by a driver blade hitting a fastener.

Action of a process in which the fastener 78 is driven into the object W1 is as follows. When the first head 78B collides with the object W1 and the fastener 78 stops, the first head 78B and the second head 78C are exposed from the object W1. When the tip of the nose part 13 is separated from the object du to the reactive force caused by the driver blade 29 hitting the fastener 78, the nose part 13 moves so as to be separate from the operator. The nose part 13 moves, for example, from a position shown by the broken line in FIG. 11 toward an upper-right direction as shown by the solid line. At this time, the nose part 13 receives the reactive force and moves in a direction parallel to an axis line H1 of the handle 20.

The driving device 10 of the present embodiment is provided with an opening 98 in the nose part 13. Therefore, in a process of separating the nose part 13 from the object W1, a portion of the fastener 78 exposed from the object W1 passes through the opening 98 and the space 110. Therefore, the present embodiment can suppress the contact of the nose part 13 with the fastener 78, in particular, suppress the contact of the nose part 13 with the second head 78C. Further, as shown in FIG. 10, the width L1 of the opening 98 is larger than the outer diameter R2 of the second head 78C of the fastener 78 in a plane perpendicular to an operating direction of the striking part 12. Furthermore, the length L5 is set to 0.4 times or more than the second length L3. Therefore, the contact of the nose part 13 with the second head 78C of the fastener 78 can be more reliably suppressed.

The magazine 77 projects from the nose part 13 in the plane perpendicular to the operating direction of the striking part 12. Consequently, in the process of separating the nose part 13 from the object W1, the central line A1 is inclined with respect to a surface of the object W1 in a direction in which the magazine 77 approaches the object W1. In the operating direction of the striking part 12, the opening 98 is provided within a range in the same direction as a direction in which the handle 20 protrudes from the cylinder case 19. Therefore, when the central line A1 is inclined with respect to the surface of the object W1 in the direction in which the magazine 77 approaches the object W1 due to the reaction caused by driving the fastener 78 into the object W1, the contact of the nose part 13 with the fastener 78 can be suppressed.

As shown in FIG. 6, the first length L2 is equal to or larger than the second length L3 of the fastener 78. While the first head 78B contacts with the object W1 and the fastener 78 stops after the fastener 78 has been hit by the driver blade 29 and moved, the second guide portion 92A contacts with the second head 78C and determines the posture of the fastener 78. Therefore, the central line B1 of the fastener 78 can be maintained substantially perpendicular to a surface of the object W1. Further, when the broken connecting element 87 is discharged from the injection path 97 through the opening 98 into the space 110, it collides with the wall 100 and falls on the surface of the object W1. Therefore, scattering of broken pieces of the connecting element 87 at a work place can be suppressed. Further, the operator can hang a tool on the second head 78C and pull out the fastener 78 from the object W1.

FIG. 13 is another example in which a part of the nose part 13 is modified. A connecting plate 102 has an arc shape in the plane perpendicular to the operating direction of the striking part 12. The blade guide 91 has an arc shape in the plane perpendicular to the operating direction of the striking part 12. Each of bottom surfaces of the blade guide 91 and the wall 100 has an oval shape.

An example of each technical meaning of matters disclosed in the embodiment is as follows. The driving device 10 is an example of a driving device. The nose part 13 is an example of a nose part. The striking part 12 is an example of a striking part. The cylinder case 19 is an example of a main body. The handle 20 is an example of a handle. The injection path 97 is an example of an injection path. The opening 98 is an example of an opening. The magazine 77 is an example of a magazine. The direction along the central line A1 is an example of a linear moving direction of the striking part.

The blade guide 91 is an example of a first member. The guide plate 92 is an example of a second member. The first guide portion 91A is an example of a first guide portion. The second guide portion 92A is an example of a second guide portion. The wall 100 is an example of a wall. The connecting element 87 is an example of a connecting element. The fastener 78 is an example of a fastener or nail. The shaft portion 78A is an example of a shaft portion. The first head 78B is an example of a first head. The second head 78C is an example of a second head. The first head 78B and the second head 78C are examples of heads. The direction E1 is an example of a direction in which the handle protrudes from the main body. The direction E2 is an example of a direction intersecting with the direction E1. The direction E1 and direction E2 may intersect at an angle different from 90 degrees. The range R2 is an example of a range.

The width L1 of the opening 98 is an example of a width of an opening. The first length L2 is an example of a length from the tip of the nose part to the second guide portion. The outer diameter R1 is an example of an outer diameter. The second length L3 is an example of the maximum length from the first head to the second head. The first direction D1 in which the striking part 12 goes down (descends) is an example of a first direction. The second direction D2 in which the striking part 12 go up (ascends) is an example of a second direction. The pressure accumulator 18 and the pressure chamber 26 are an example of a first energizing mechanism. The electric motor 15, the rotational shaft 46, and the wheel 81 are an example of a second energizing mechanism. FIGS. 2, 7, 8, 9, 10, and 13 each correspond to a plan view perpendicular to the linear moving direction of the striking part.

The driving device is not limited to the disclosed embodiments, and can be variously modified within a range of not departing from the gist thereof. For example, a magazine may be any of: a container in which a plurality of fasteners are arranged at intervals in a radial direction of the shaft portion and which accommodates them in a straight line; and a container in which a plurality of fasteners are arranged at intervals in the radial direction of the shaft portion and which accommodates them in a spiral shape.

The wall may be provided on either the nose part or the magazine. Further, a state in which the fastener is not completely driven into the object includes the following states. It is a state where in a fastener having one head, each part of the head and a shaft portion is exposed to the outside of the object.

The nose part may include a main body fixed to the housing and having an injection path, and a push lever movable in the linear moving direction of the striking part with respect to the main body. In this case, the opening is provided at the tip of the push lever.

Provided as the first energizing mechanism can also be either a solid spring or a magnet or a pressure accumulator. The solid spring energizes the striking part with elastic energy. The magnet energizes the striking part with a magnetic force. The pressure accumulator energizes the striking part with the pressure of compressed air supplied from the outside of the housing.

If the first energizing mechanism is a solid spring or magnet, a motor can be used as the second energizing mechanism. As the motor, any of an electric motor, a hydraulic motor, a pneumatic motor, and an engine can be used. When the first energizing mechanism is a pressure chamber, a return air chamber can be provided as the second energizing mechanism. The return air chamber energizes the striking part in the second direction with the pressure of the compressed air.

Used as the compressed air, which energizing the striking part in the first direction, can be inert gas such as nitrogen gas or rare gas instead of the compressed air. Further, the standby position of the striking part may be a position where the piston contacts with the bumper and is stopped.

The fastener fixes the objects to each other by being driven into or biting into the plurality of objects. The fastener may be either a member that finally fixes the plurality of objects to each other or a member that temporarily fixes the plurality of objects to each other. The fastener may be either a nail having a head or a nail without a head. Further, the fastener may have either a shaft shape or an arch shape. The nose part has a function of guiding the striking part in the operating direction and a function of maintaining the posture of the fastener. The nose part is, for example, made of metal or a synthetic resin. The striking part is an element that partially strikes the fastener, and has a shaft portion.

The main body may be any of a casing, a shell, a boss portion, a housing, and the like. The handle protrudes from the main body, and the operator holds the handle by hand. As an example, the handle may be made of either metal or a synthetic resin. The outer surface of the handle may be coated with an elastomer. The injection path includes a passage, a hole, a space, a gap, and the like. The opening is obtained by notching a portion of the nose part, and may be a slit, a recess, a window portion, or the like. The opening connects with an end of the nose part. The first member and the second member can each be made of metal or a synthetic resin. The first guide portion and the second guide portion include ribs, wall surfaces, protrusions, rails, and the like. The power supply unit may be either a DC power supply or an AC power supply. The AC power supply is connected to the housing by a power cable. The DC power source may be either a secondary battery or a primary battery. The object into which the fastener is driven may be any of a wood, a concrete, a gypsum board, a decorative board, and the like.

EXPLANATION OF REFERENCE NUMERALS

10 . . . Driving device; 19 . . . Cylinder case; 12 . . . Striking part; 13 . . . Nose part; 15 . . . Electric motor;

18 . . . Pressure accumulator; 26 . . . Pressure chamber; 46 . . . Rotational shaft; 77 . . . Magazine; 87 . . . Connecting element: 78 . . . Fastener; 78A . . . Shaft portion; 78B . . . First head; 78C . . . Second head; 81 . . . Wheel; 91 . . . Blade guide; 91A . . . First guide portion; 92 . . . Guide plate; 92A . . . Second guide portion; 97 . . . Injection path; 98 . . . Opening; 100 . . . Wall; D1 . . . First direction; D2 . . . Second direction; E1, E2 . . . Direction; L1 . . . Width; L2 . . . First length; L3 . . . Second length; L4 . . . Third length; R1 . . . Outer diameter; R2 . . . Outer diameter; and H2 . . . Range.

The invention claimed is:

1. A driving device comprising:
- a main body;
- a striker movably supported by the main body and operable to move along a first direction to hit a fastener;
- a handle extending from the main body in a second direction perpendicular to the first direction; and
- a nose attached to the main body and holding the fastener to be hit by the striker,
- wherein the fastener has:
  - a shaft having a constant outer diameter; and
  - a head having an outer diameter larger than that of the shaft, and
- wherein the head includes:
  - a first head; and
  - a second head is located behind the first head in the first direction, the second head being subject to being hit by the striker, and
- wherein the nose comprises:
  - an injection path provided between a first guide portion and a second guide portion opposite the first guide portion, the injection path guiding the fastener hit by the striker; and
  - an injection port, from which the fastener is fired, provided at an end of the injection path; and
  - an opening located forward of the second guide portion in the first direction,
- wherein a width of the opening in a third direction perpendicular to both the first direction and the second direction is larger than an outer diameter of a head of the fastener, and
- wherein, in the first direction, a length from a tip of the nose to the second guide portion is longer than a length of the first head of the fastener.

2. The driving device according to claim 1, wherein the width of the opening is larger than a width of the injection port in the third direction.

3. The driving device according to claim 1,
- wherein the nose has a first member and a second member,
- wherein the first member and the second member are arranged alongside in the second direction,
- wherein the injection path is provided between the first member and the second member, and
- wherein the opening is a space provided by an end of the second member in the first direction and an end of the first member in the second direction.

4. The driving device according to claim 3,
- wherein the second member has a wall protruding along the first direction, and
- wherein the opening is arranged between the first guide portion and the wall in the second direction.

5. The driving device according to claim 4, wherein a position of a tip of the wall of the second member is located behind a position of a tip of the first member in the first direction.

6. The driving device according to claim 4,
- wherein the wall has two side plates arranged so as to face each other, and
- wherein a width between the two side plates is formed to be larger than a width of the injection port.

7. The driving device according to claim 3,
- wherein the second member has a wall protruding along the first direction,
- wherein the opening is disposed between the first guide portion and the wall, and
- wherein a length from the second head to the wall in the second direction is longer than an outer diameter of the second head when the fastener has been driven into a workpiece, and the first head and a tip of the nose remain in contact with the workpiece.

8. The driving device according to claim 3, wherein, in the first direction, a length from a tip of the nose to the second guide portion is equal to or less than a length from the first head to the second head.

9. The driving device according to claim 3,
- wherein the second member has a wall protruding in the first direction, and
- wherein the first member and the wall are arranged in an oval shape when viewed in the first direction.

10. The driving device according to claim 1,
- wherein the nose has a first member and a second member,
- wherein the first member and the second member are arranged alongside in the second direction,
- wherein the injection path is provided between the first member and the second member,
- wherein the second member has a wall protruding along the first direction,
- wherein the opening is disposed between the first guide portion and the wall in the second direction, and
- wherein a length from an outer peripheral surface of the second head to the wall in the second direction is 0.4 times or more than a second length from a top surface of the first head to a bottom surface of the second head in the first direction when the fastener has been driven into a workpiece, and the first head and a tip of the nose remain in contact with the workpiece.

11. The driving device according to claim 1, further comprising a magazine extending from the nose and holding the fasteners,
- wherein at least a part of the magazine and at least a part of the handle overlap with each other in the first direction.

12. The driving device according to claim 1, further comprising:
- a first energizing mechanism configured to move the striker in the first direction so that the striker strikes the fastener; and
- a second energizing mechanism configured to move the striker in a direction opposite to the first direction.

13. A driving device comprising:
- a main body;
- a striker movably supported by the main body and operable to move along a first direction to hit a fastener;
- a handle extending from the main body in a second direction perpendicular to the first direction; and
- a nose attached to the main body and holding the fastener to be hit by the striker, wherein the fastener has:

a shaft having an outer diameter, and having a first end that is a tapered shape configured to penetrate a material, and a second end opposite the first end;

a first head disposed at the second end of the shaft, the first head having a first outer diameter greater than the outer diameter of the shaft; and a second head is located behind the first head in the first direction, the second head having a second outer diameter greater than the outer diameter of the shaft, and the second head being subject to being hit by the striker, and wherein the nose has:

a first member and a second member arranged alongside in the second direction; and an injection path, provided between the first member and the second member, guiding the fastener hit by the striker and accommodating the striker after hitting the fastener, wherein the first member has a first guide portion, wherein the second member has a second guide portion, wherein the first guide portion and the second guide portion are disposed in positions that allow the first guide portion and the second guide portion to contact the fastener so that the injection path through which the fastener passes is defined, and wherein, in the first direction, a length from a tip of the nose to the second guide portion is greater than the length of the first head of the fastener and is equal to or less than a length from the first head to the second head of the fastener.

14. A driving device comprising:

a main body;

a striker movably supported by the main body and operable to move along a first direction to hit a fastener;

a handle extending from the main body in a second direction perpendicular to the first direction; and a nose attached to the main body and holding the fastener to be hit by the striker, wherein the fastener has:

a shaft having an outer diameter, and having a first end that is a tapered shape configured to penetrate a material, and a second end opposite the first end;

a first head disposed at the second end of the shaft, the first head having a first outer diameter greater than the outer diameter of the shaft; and a second head located behind the first head in the first direction, the second head having a second outer diameter greater than the outer diameter of the shaft, and the second head being subject to being hit by the striker, and wherein the nose has:

an injection path provided between a first guide portion and a second guide portion which is opposed by the first guide portion that guiding the fastener hit by the striker and accommodating the striker after hitting the fastener;

an injection port, through which the fastener passes, provided at an end of the injection path, a wall disposed away from the injection path in the second direction and extending along the first direction, an opening disposed between the first guide portion and the wall in the second direction, and located forward of the second guide portion in the first direction, and a first length from an outer peripheral surface of the second head to the wall in the second direction is 0.4 times or more than a second length from a top surface of the first head to a bottom surface of the second head in the first direction when the fastener has been driven into a workpiece, and the first head and a tip of the nose remain in contact with the workpiece.

15. The driving device according to claim 14, wherein the first length is 0.5 times or more than the second length.

16. The driving device according to claim 14, wherein the first length is 0.5 times or more, and less than or equal to the second length.

* * * * *